United States Patent [19]

Flaherty

[11] Patent Number: 4,919,512

[45] Date of Patent: Apr. 24, 1990

[54] WAVELENGTH SHIFT SWITCH AND SENSING SYSTEM

[75] Inventor: Bruce W. Flaherty, Hemit, Calif.

[73] Assignee: McDonnell Douglas Corporation, Long Beach, Calif.

[21] Appl. No.: 258,557

[22] Filed: Oct. 17, 1988

[51] Int. Cl.⁵ .............................................. G02B 6/02
[52] U.S. Cl. .:............................. 350/96.29; 350/96.15; 250/227.11
[58] Field of Search ................. 350/96.15, 96.16, 96.2, 350/96.29, 96.3; 250/227, 458.1, 459.1, 474.1

[56] References Cited
U.S. PATENT DOCUMENTS

| | | | |
|---|---|---|---|
| 4,278,327 | 7/1981 | McMahon et al. | 350/347 |
| 4,371,897 | 2/1983 | Kramer | 250/227 X |
| 4,488,046 | 12/1984 | Bernstein | 250/474.1 |
| 4,492,121 | 1/1985 | Lehto | 250/227 X |
| 4,735,485 | 4/1988 | Shaw et al. | 350/96.29 |
| 4,774,407 | 9/1988 | Erbe | 250/227 |
| 4,788,437 | 11/1988 | Urquhart et al. | 250/486.1 |
| 4,833,332 | 5/1989 | Robertson, Jr. et al. | 250/458.1 |

Primary Examiner—William L. Sikes
Assistant Examiner—John Ngo
Attorney, Agent, or Firm—Curt L. Harrington; George W. Finch; John P. Scholl

[57] ABSTRACT

A multi position optical switch requiring no electrical service at the actuator and capable of continuous or discrete sensing of switch position is disclosed.

30 Claims, 5 Drawing Sheets

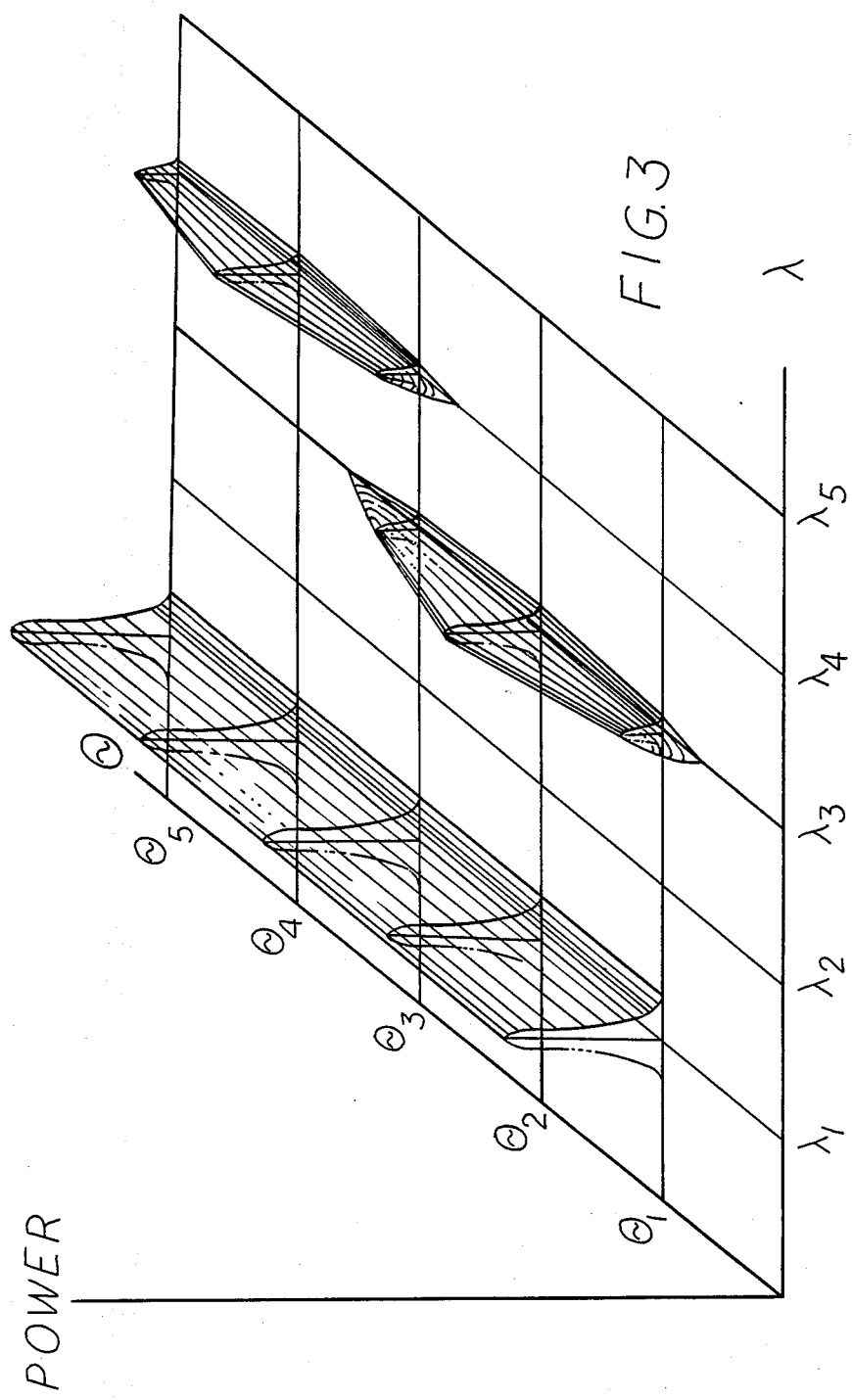

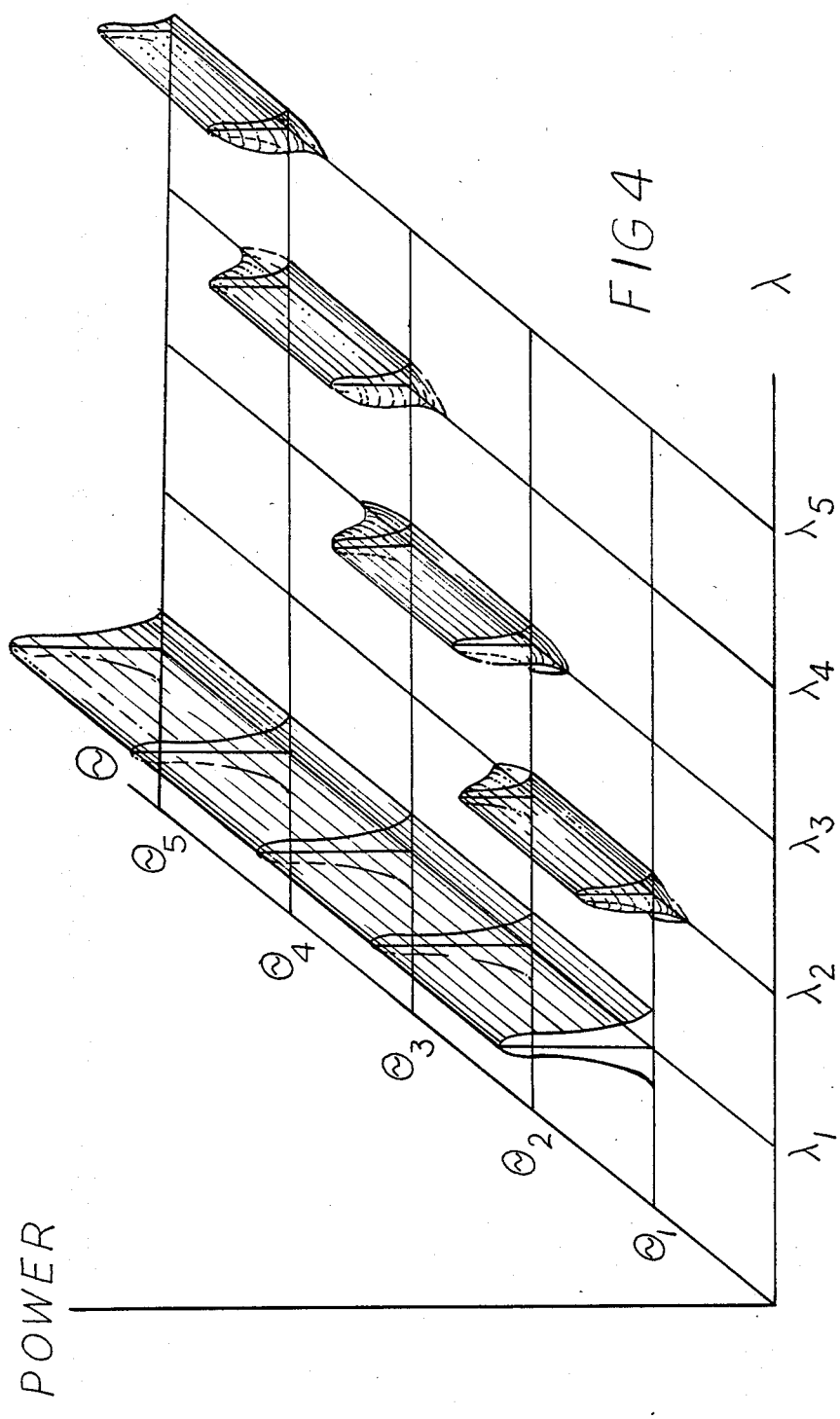

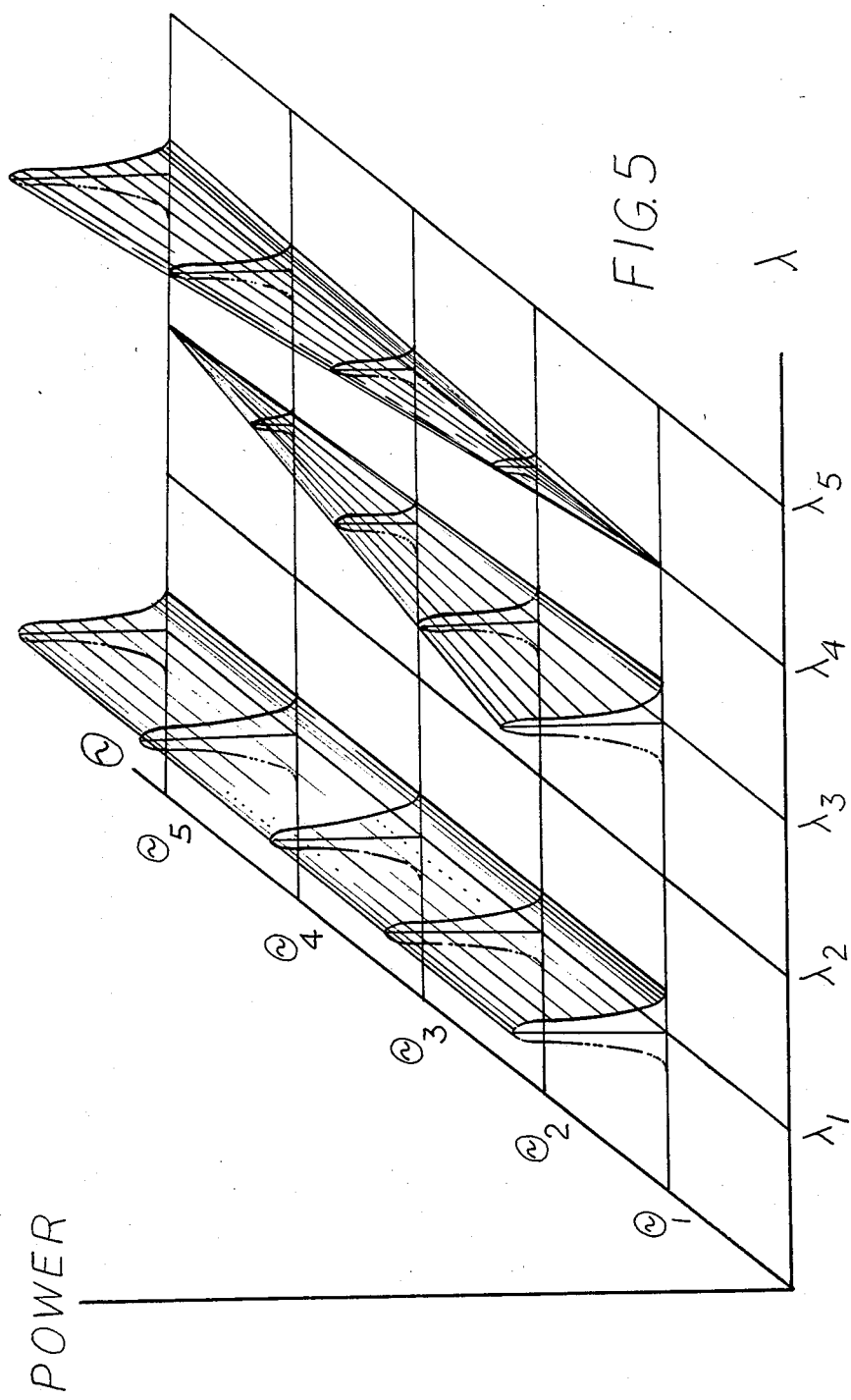

WAVELENGTH SHIFT SWITCH AND SENSING SYSTEM

BACKGROUND OF THE INVENTION

Industry has long used various types of switches and sensors for remote detection of many different conditions. For example, the linear variable displacement transducer uses the signal resulting from the electrical energization of a coil having a moveable ferrite core attached to a mechanical member to ascertain the position of the mechanical member. The failure modes in this typical sensing system are obvious. One or both of the energization wires to the coil could be severed. One or more of the sensing wires could be severed.

It would therefore be generically desirable to employ a switch or remote sensor having no electrical connection at the remote location. Due to the vibration and wear often occurring between the remote location and the device interpreting the signal from the sensor, it would be desirable to have a system which could withstand partial severance of the means with which the switch signal is transmitted.

One answer to this problem has been the use of a single fiber reflective switch sensing system. However, problems relating to interference from back reflections and scattering and the problems associated with light path discontinuities have made the present methods still less than ideal in meeting the needs of the industry.

SUMMARY OF THE INVENTION

The wavelength shift switch and sensing system of the present invention will require no electrical connection at the sensing point. Because the switch and sensor of the present system utilizes the detection of wavelength rather than intensity, back reflections and breaks in the light transmission system will not inadvertently cause an erroneous indication of switch position. The system of the present invention can operate with some degree of discontinuity in the light transmission system. However, unworkable discontinuities will produce an error signal rather than an erroneous switch position indication.

The light re-radiated from the remote sensing device will have a frequency outside of the band of frequencies being transmitted to the remote sensing device. Therefore back reflections will comprise light of a frequency outside the band of frequencies being measured to determine switch position.

The remote sensing switch can be designed to indicate discrete positions or continuous positioning much like the linear variable displacement transformer. The wavelength shift switch and sensing system of the present invention will operate well in a wide range of temperature environments. The wavelength shift switch and sensing system may be multiplexed upon multimode fiber with other like wavelength shift switches in order to combine a series of switches on a common cable.

The optical switch elements are especially advantageous where size and weight limitations dictate switch design. The optical switch elements can be put into a small volume less than a cubic millimeter if necessary.

BRIEF DESCRIPTION OF THE DRAWINGS

The structure and method of operation of the invention, together with additional advantages thereof, will be best understood from the following description of specific embodiments when read in connection with the accompanying drawings in which:

FIG. 3 is an isometric view of a three dimensional surface formed by plotting spectral power versus wavelength versus transducer angle for the wavelength shift switch and sensing system of FIG. 1, with significant frequency crossover;

FIG. 4 is an isometric view of a three dimensional surface formed by plotting system spectral power versus wavelength versus transducer angle for the more general multiposition wavelength shift switch and sensing system of FIG. 1, with some frequency crossover; and FIG. 5 is an isometric view of a three dimensional surface formed by plotting spectral system power versus wavelength versus transducer angle for the wavelength shift switch and sensing system of FIG. 1.

DETAILED DESCRIPTION OF THE PREFERRED EMBODIMENT

Figure 1:
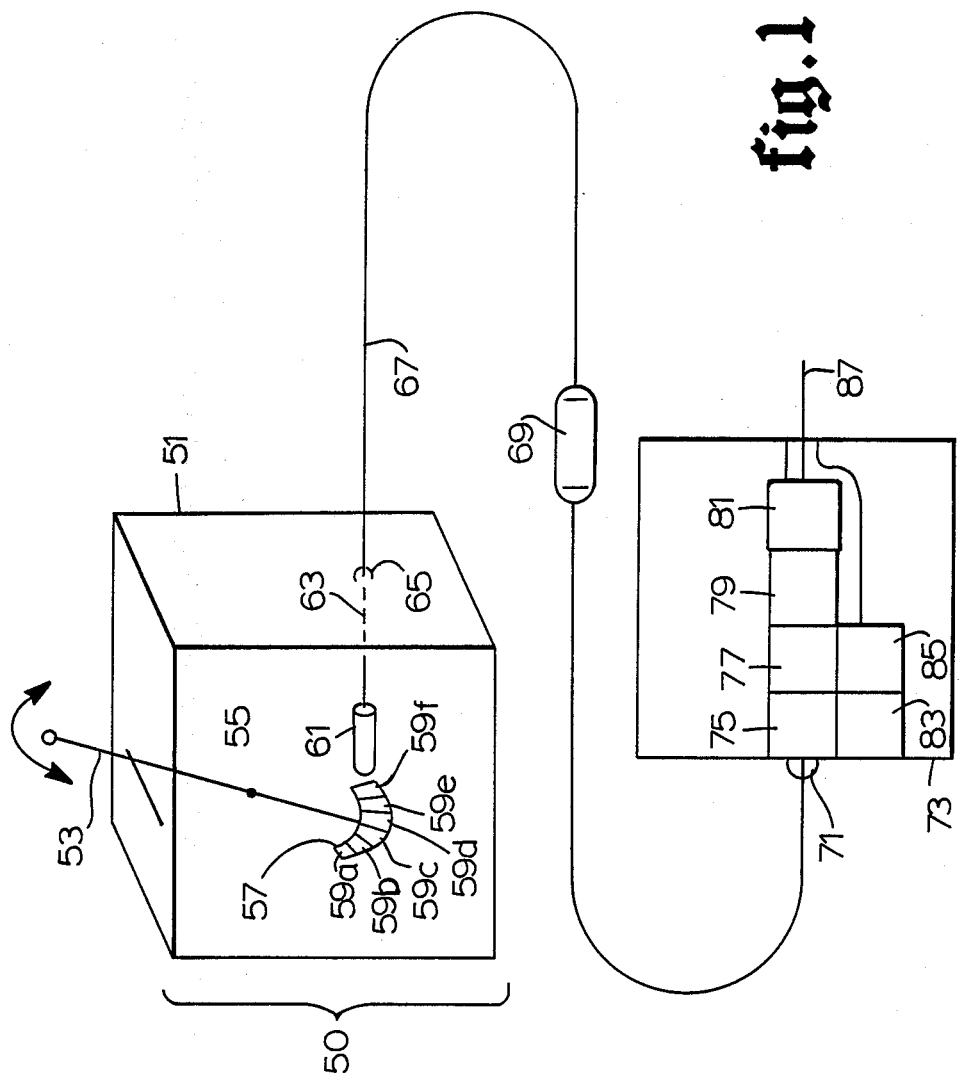
FIG. 1 is a schematic view of the wavelength shift switch and sensing system of the present invention.

Referring to FIG. 1, a schematic view of the wavelength shift switch and sensing system of the present invention is shown. A switch designated as 50 generally has a housing 51 and an actuator arm 53. A two headed arrow illustrates the direction of actuator arm 53. Within housing 51, actuator arm 53 pivots about a pivot 55. At the end of actuator arm 53 is an optical surface 57. It is understood that optical surface 57 may be an optical volume; however, for simplicity, it will be referred to throughout as a surface. Optical surface 57 is divided into a series of optical subsurfaces $59_a$, $59_b$, $59_c$, $59_d$, $59_e$, and $59_f$. Adjacent and colinear with a line perpendicular to the surfaces $59_a$, $59_b$, $59_c$, $59_d$, $59_e$, and $59_f$ is an optical pickup 61. Optical pickup 61 is connected to an internal optical fiber 63. Internal optical fiber 63 is connected to an optical connector 65. Optical connector 65 is connected to an optical fiber 67. Optical fiber 67 may have one or more in line connectors and adapters 69 shown connected to optical fiber 67 as needed.

Optical fiber 67 is connected to connector 71. Connector 71 is attached to a transciever housing 73. Within transciever housing 73, and in optical alignment with connector 71, is an optical coupler 75. In optical alignment with optical coupler 75 is an optical dispersion element 77. In optical alignment with optical dispersion element 77 is an optical detector 79. Attached to optical detector 79 is receiver interface 81.

Adjacent optical coupler 75 is an optical transmitter 83. Adjacent and connected to optical transmitter 83 is a transmitter interface 85. A lineout 87 connects the elements 75-85 within transciever housing 73 to other components, not shown, as necessary.

In operation, the actuator arm 53 will be attached to some structural member whose position is desired to be monitored. Alternatively, actuator arm 53 can be manually operated to one or more positions such as would be done in the case of a selector switch.

As actuator arm 53 is moved along the axis indicated by the double arrow about the pivot 55, differing areas 59 come into linear optical alignment with optical pickup 61. Each area 59 is made up of a different fluorescent material. Fluorescence is the property of a material whereby it absorbs light in one or more wavelengths and then reradiates light in another wavelength or wavelengths, which are typically longer.

In FIG. 1, the position of actuator arm 53 will determine which fluorescent surface 59 is in optical alignment with optical pickup 61. The fluorescent properties of each surface 59 will ideally differ slightly from those of the adjacent panel. For example, given a constant wavelength light received by surfaces 59, surface $59_a$ will fluoresce to produce emitted light shifted in wavelength. A surface $59_b$, next adjacent to surface $59_a$, will fluoresce or re-radiate to produce re-emitted light shifted in wavelength slightly more than the light emitted from surface $59_a$, but not overlapping. Likewise, surface $59_c$, next adjacent to surface $59_b$, will fluoresce to produce emitted light shifted in wavelength slightly more than the light emitted from surface $59_b$, but not overlapping.

In this manner, the re-emitted fluoresced or re-radiated light back through optical pickup 61 from surfaces 59 will exhibit a wavelength depending upon which surface 59 is in optical alignment with optical pickup 61. Light having wavelengths ideally outside the band of re-radiated or fluoresced wavelengths of those is supplied to optical pickup 61 from the transciever housing 73 by means of optical fiber 67. Fluoresced light from surfaces 59 return along the same optical fiber 67.

Within transceiver housing 73, transmitter interface 85 is commanded by lineout 87. Transmitter interface 85 actuates optical transmitter 83 which provides light, typically but not limited to single frequency light, required to make surfaces 59 re-radiate wavelength shifted light to optical fiber 67.

As previously mentioned, preferably the light supplied by optical transmitter 83 is of one or more wavelengths outside the spectrum of wavelengths which would be re-radiated by the fluorescence of surfaces 59. Once the surface 59 in optical alignment with optical pickup 61 has fluoresced, the light transmitted back through optical fiber 67 is received at optical coupler 75 and is passed to optical dispersion element 77. Optical dispersion element spreads the spectrum to enable the frequency to be detected as a function of its diffracted position. The optical detector 79 acts as a target and is positionally illuminated as a function of the frequency of fluoresced light received. Receiver interface 81 treats the signal from optical detector 79 and electronically transmits a signal along line out 87 indicative of the frequency or frequencies of fluoresced light received.

Note that there are no electrical inputs to the device defined by switch 50 within housing 51. Note also that since the transceiver operates o frequency instead of intensity, a break along optical fiber 67 which still has some optical alignment will still allow the wavelength shift switch and sensing system of the present invention to function if the energy of the fluoresced light is sufficient to trigger the optical detector 79. Note that connectors and adapters 69 may represent optical splitters in an extended integrated optical switch system. Such a system may use switches at the connectors and adapters 69 to selectively enable certain of the optical switches 50.

Since the wavelength shift switch and sensing system of the present invention is wavelength dependent, the only necessary extended system consideration would involve ensuring that enough power is supplied to optical fiber 67 in order that after repeated splitting, enough light energy reaches switch 50 to create enough fluorescence to return through the various connectors and adaptors 69 and reliably activate optical detector 79.

Figure 2:
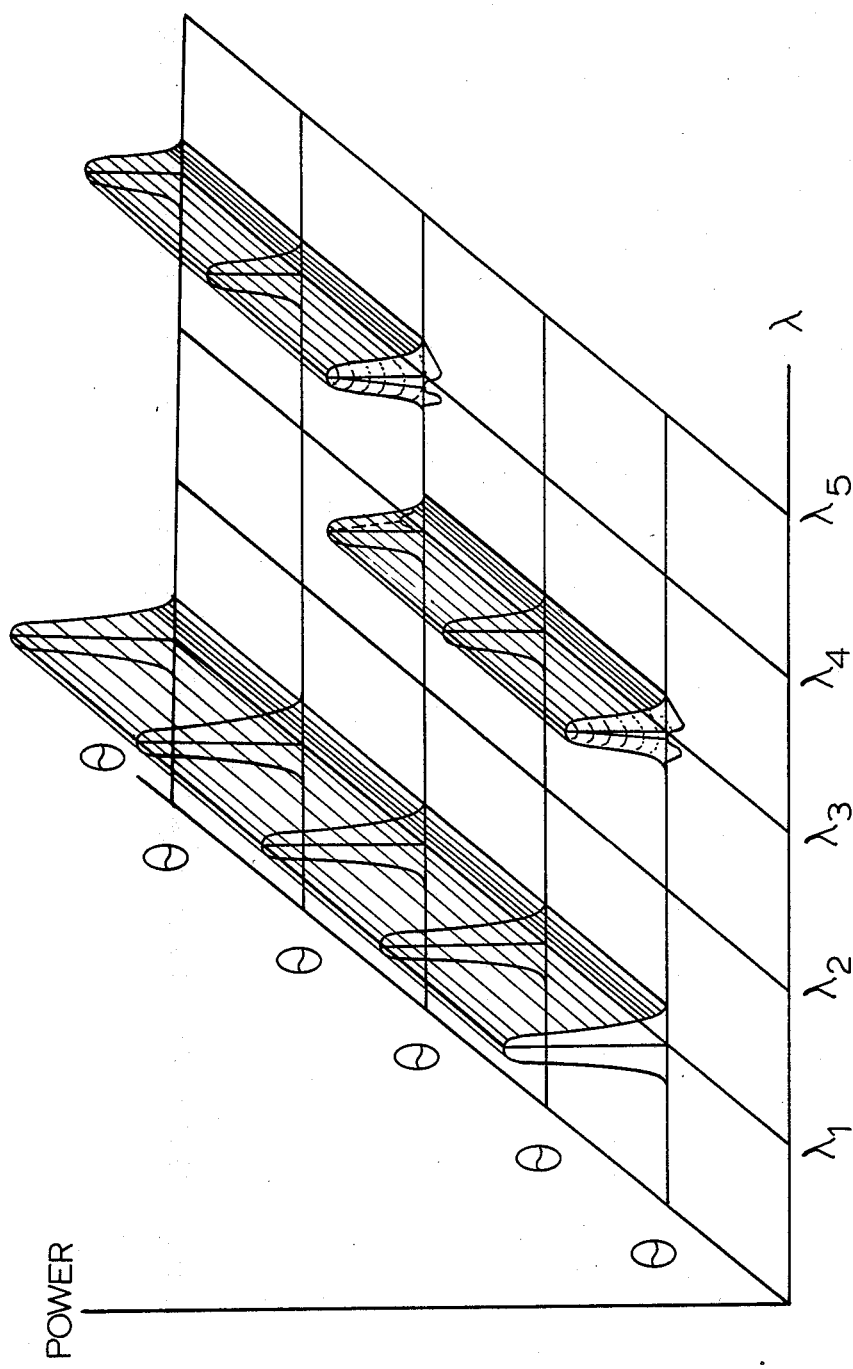
FIG. 2 is an isometric view of a three dimensional surface formed by plotting system spectral power versus wavelength versus transducer angle for the two or three position wavelength shift switch and sensing system of FIG. 1, with very little frequency crossover.

The workings of the wavelength shift switch and sensing system of the present invention now disclosed, several schemes of optical reduction to practice may be illustrated. Referring to FIG. 2, an isometric view of a three dimensional surface formed by plotting spectral power in the optical system versus wavelength versus transducer angle for the wavelength shift switch and sensing system of FIG. 1 is shown. The ordinate of the graphical surface represents the spectral power of the recieved light signals of the system. The abscissa represents the wavelength of the received light. Into the paper is projected theta ($\theta$), the angle of actuator arm 53 shown in FIG. 1. As the actuator arm 53 is moved into a first position, $\theta_1$, the switch 50 returns re-radiated light energy which it recieved from transmitter 83 which is radiating light energy at the third indicated wavelength. While the actuator arm 53 is moved from angular position $\theta_1$ to $\theta_4$, the received light energy is re-radiated primarily in a spectrum about the fourth indicated wavelength. Note the transition point between the third and fourth indicated wavelengths which occurs near $\theta_3$. In this range, the switch 50 can be utilized as a linear displacement actuator which indicates position according to the relative amounts of the two indicated wavelengths recieved.

The spectrum of re-radiated light is defined from the method used to obtain a wavelength shift. In this particular method we are using electronic transitions in a fluorescent material to absorb light energy from the transmitter, in this case, and re-radiate it in the spectrum of light energy which is shifted from the spectrum of light energy received from the transmitter.

This spectrum shape could be some form of a Gaussian, Lorentzian, or combination which results in a bell type curve. At nominal power levels, spectral bandwidths and detection rates, the spectral power received should not be so small that there is no appreciable probability that there will be no light during a detection period. For the proposed applications, the detection periods can permissibly be from about 0.01 to 1.0 seconds. Spectral bandwidths can be on the order of 1 nanometer or less if filters are employed.

One of the advantages of the invention is illustrable using FIG. 3. In an ordinary on-off switch wherein a signal would normally be received if the switch is on, and where no signal would be received if the signal was off, it would be impossible to detect a fault condition in the off position. In addition, a broken optical fiber 67 would register as an off condition.

Attenuation of spectral power of the received fluorescent light is shown by two mechanisms. Along each wavelength axis the attenuation is with respect to light at that wavelength. Thus, received light may be changing wavelengths, and the power from one wavelength may drop, even though the power at another wavelength increases.

Power may attenuate from one wavelength to another. This is due to the use of a fluorescent material on surfaces 59 which take a sharply defined input wavelength of light and output a shifted wavelength also having a sharply defined wavelength. The bell type curve along the theta axis does indicate that in real terms a slight probability function of wavelengths is produced. In other words, there is some play or error associated with the shifting operation ocurring at surfaces 59.

However, in the wavelength shift switch and sensing system of the present invention, the fact that the switch always returns a re-radiated signal derived from the transmitter 83 signal means that the optical detector 79 will always receive one or two of these re-radiated signals at some level, even if the means of signal transmission and reception is partially blocked, obscured, attenuated, or reflected. If one wanted to sense some other quantity besides a switch position, such as system transmission at a certain wavelength, one could attach a small strip of material which fluoresces in the region of interest and include this constant fluorescence strip in the viewing area of pickup 61 such that no matter the position of actuator arm 53 in FIG. 1, the constant fluorescence strip would always be present to indicate system failsafe. The single wavelength of light emitted by such a strip would serve as an indicator that the switch 50 is operating properly. This is represented in FIG. 3 by the constant amplitude power distribution along the axis of the first wavelength. This can be achieved on switch 50 by attaching a small arc-shaped strip of material which fluoresces to the necessary wavelength to the inner radius of surfaces 59, which would be continuous across each subdivision.

Because of the same sloping wavelength attenuation of the third and fourth wavelengths shown on FIG. 3, the actuator arm 53 switch 50 set up to give this power-wavelength characteristic could be used as an intensity sensitive expanded linear variable displacement actuator. In the range between $O_4$ and $O_5$ the ratios of signal power could be utilized, in addition to singular signal strength to indicate the position of actuator arm 53. Outside of this range, the power of the signal strength alone would be used to indicate actuator arm 53 position. This is a continuous mode, but it is understood that the switch 50 of the present invention can always be used in discrete mode.

This mode of operation would possibly involve spring loading the actuator arm 53, or in the alternative, setting detector 79 to indicate a first position if the intensity of a first wavelength is greater than the intensity of a second wavelength or to indicate a second position if the intensity of a second wavelength is greater than the intensity of the first wavelength. Note that throughout the range of operation shown in FIG. 3, that the first wavelength is used not only as a failsafe indicator, but also to measure the system transmission to ensure that when the third and fourth indicated wavelengths are detected singly, that it is known how to readjust the measured value of the powers to get a more accurate reading on the actuator angle. This and other modes of operation are determined by how the fluorescent surfaces 59 are arranged, their geometry with respect to optical pickup 61, and the axis of movement of actuator arm 53.

Referring to FIG. 4, an alternative mode of operation is illustrated. Here, in addition to the first wavelength, the other wavelengths exist in fairly even power intensity over selected angles of actuator arm 53. The sharp attenuation over a given wavelength allows switch 50 to operate as a selector switch over several wide bands. When the actuator arm is in a range of positions, one wavelength will be detected. In this manner, discreteness can be incorporated into a continuous switch wherein the exact location of actuator arm 53, within a range of location angles, is a "don't care" condition. It is understood for all of the three dimensional figures that the lambda and theta axes can be extended as far as physically realizeable to enable a switch 50 to have as many positions over as many angles as necessary.

Referring to FIG. 5, an alternative mode of operation is illustrated having an extended variable displacement characteristic. Here, in addition to the first fail-safe and transmitter diagnostic wavelength, the other two wavelengths exist in a ramped power intensity over all of the angles of actuator arm 53. The even attenuation over a given wavelength allows switch 50 to operate as a linear variable placement transducer over a wide range of positions of actuator arm 53 positions. Eliminating the need to depend on signal strength by eliminating the range outside the presence of two dissimilar wavelengths enhances the accuracy of the transducer. This operation would compensate for spectral transmission changes in the system due to optical path discontinuities that form resonant cavities or due to components which do not have a flat optical transfer function in the vicinity of the operating wavelengths.

At least two wavelengths are necessary, and the ratio of the intensities of the two wavelengths are measured to determine the exact position of actuator arm 53. Still referring to FIG. 5, this adds to the fail-safe character of the invention since a break or injury to optical fiber 67 of FIG. 1 and will reduce the intensity of both the third and fourth wavelength, but can have no effect on their relative ratios, so long as some of their spectral power is able to pass back through optical fiber 67. No matter where the actuator arm 53 is located, one ratio of intensity of the third wavelength power with respect to the intensity of the fourth wavelength power will define that location. Additional measurements utilizing additional wavelengths will generally increase accuracy.

It is also understood that the fluorescent surface referred to in this disclosure can be replaced by any frequency or wavelength shifting solid, liquid or gas. The structure embodying the solid, liquid or gas may be a volume surface or line. The shift in wavelength may range from a few nanometers to many nanometers. The shift in wavelength may be accomplished by means electronic, acoustooptic, magnetooptic, or electrooptic. The mechanism creating the shift in wavelength or frequency may be via fluorescence, resonance radiation, thomson scattering, rayleigh scattering, mie scattering, phosphorescence, raman scattering, Brillouin scattering, parametric scattering, harmonic generation, diffraction, or doppler shifting or any combination of these.

It is understood that the wavelength shift switch and sensing system of the present invention can also be implemented in more than one axis. For example, surfaces 59 can be formed into a sphere at the bottom of a two axis joystick. The arrangement of the fluorescent material upon surfaces 59 can be prespecified to indicate the exact, two-dimensional location of actuator arm 53.

It is understood that these claims do not restrict the internal optical power densities in the switch 50 or limit the transmitter power or energy pulse width, pulse shape, duty cycle, spectrum, bandwidth, or number of output spectrum.

The forgoing disclosure and description of the invention are illustrative and explanatory thereof, and various changes in the materials of construction, physical configuration, type of fluorescent material and types of light sources used to power the switch, and in desired performance characteristics to be achieved, as well as in the details of the illustrated embodiments may be made without departing from the spirit and scope of the invention.

What is claimed is:

1. A wavelength shift switch and sensing system comprising:
   a optic fiber having a first end and a second end;
   a fluorescent surface optically aligned and controllably and relatively movable with respect to said first end of said optic fiber;
   an optical transmitter connected to, and in optical alignment with said second end of said optical fiber; and,
   an optical sensor connected to, and in optical alignment with said second end of said optical fiber.

2. The wavelength shift switch and sensing system as recited in claim 1 and further comprising:
   an actuator arm, attached to said fluorescent surface; and,
   a switch housing pivotally supporting said actuator arm.

3. The wavelength shift switch and sensing system as recited in claim 2 and further comprising a transmitter interface attached to said optical transmitter.

4. The wavelength shift switch and sensing system as recited in claim 3 and wherein said optical sensor further comprises:
   an optical coupler;
   an optical dispersion element connected to said optical coupler;
   an optical detector connected to said optical dispersion element; and,
   an optical receiver interface connected to said optical detector.

5. The wavelength shift switch and sensing system as recited in claim 4 further comprising at least one optical connector attached to said optic fiber.

6. A wavelength shift switch and sensing system comprising:
   means for transmitting optical energy from a first location to and from a second location;
   means for controllable wavelength shifting by a prespecified amount, located at said first location and in alignment with said means for transmitting;
   means for generating said optical energy, located at said second location and in alignment with and movable with respect to said means for transmitting; and,
   means for detecting the wavelength of said optical energy, located at said second location and in alignment with said means for transmitting.

7. The wavelength shift switch and sensing system as recited in claim 6 and wherein said means for wavelength shifting further comprises:
   a fluorescent material optically aligned and movable with respect to said means for transmitting;
   an actuator arm, attached to said fluorescent material; and,
   a switch housing pivotally supporting said actuator arm.

8. The wavelength shift switch and sensing system as recited in claim 6 and wherein said means for wavelength shifting further comprises:
   a phosphorescent material optically alignable with respect to said means for transmitting;
   an actuator arm, attached to said phosphorescent material; and,
   a switch housing pivotally supporting said actuator arm.

9. The wavelength shift switch and sensing system as recited in claim 6 and wherein said means for wavelength shifting further comprises:
   a raman scattering material optically alignable with respect to said means for transmitting;
   an actuator arm, attached to said raman scattering material; and,
   a switch housing pivotally supporting said actuator arm.

10. The wavelength shift switch and sensing system as recited in claim 6 and wherein said means for wavelength shifting further comprises:
    a raleigh scattering material optically alignable with respect to said means for transmitting;
    an actuator arm, attached to said raleigh scattering material; and,
    a switch housing pivotally supporting said actuator arm.

11. The wavelength shift switch and sensing system as recited in claim 6 and wherein said means for wavelength shifting further comprises:
    a brillouin scattering material optically alignable with respect to said means for transmitting;
    an actuator arm, attached to said brillouin scattering material; and,
    a switch housing pivotally supporting said actuator arm.

12. The wavelength shift switch and sensing system as recited in claim 6 and wherein said means for wavelength shifting further comprises an acoustooptic shifter optically alignable with respect to said means for transmitting.

13. The wavelength shift switch and sensing system as recited in claim 6 and wherein said means for wavelength shifting further comprises a magnetooptic shifter optically alignable with respect to said means for transmitting.

14. The wavelength shift switch and sensing system as recited in claim 6 and wherein said means for wavelength shifting further comprises a electrooptic shifter optically alignable with respect to said means for transmitting.

15. The wavelength shift switch and sensing system as recited in claim 6 and wherein said means for wavelength shifting further comprises a resonance radiation shifter optically alignable with respect to said means for transmitting.

16. The wavelength shift switch and sensing system as recited in claim 6 and wherein said means for wavelength shifting further comprises a mie scattering shifter optically alignable with respect to said means for transmitting.

17. The wavelength shift switch and sensing system as recited in claim 6 and wherein said means for wavelength shifting further comprises a thompson scattering shifter optically alignable with respect to said means for transmitting.

18. The wavelength shift switch and sensing system as recited in claim 6 and wherein said means for wavelength shiftingfurther comprises a raleigh scattering shifter optically alignable with respect to said means for transmitting.

19. The wavelength shift switch and sensing system as recited in claim 6 and wherein said means for wavelength shifting further comprises a parametric conversion shifter optically alignable with respect to said means for transmitting.

20. The wavelength shift switch and sensing system as recited in claim 6 and wherein said means for wavelength shifting further comprises a doppler shifter optically alignable with respect to said means for transmitting.

21. The wavelength shift switch and sensing system as recited in claim 6 and wherein said means for wavelength shifting further comprises a diffracting shifter optically alignable with respect to said means for transmitting.

22. The wavelength shift switch and sensing system as recited in claim 6 and wherein said means for wavelength shifting further comprises a interfering shifter optically alignable with respect to said means for transmitting.

23. The wavelength shift switch and sensing system as recited in claim 6 wherein said means for detecting optical energy further comprises:
   an optical coupler;
   an optical dispersion element connected to said optical coupler;
   an optical detector connected to said optical dispersion element; and,
   an optical receiver interface connected to said optical detector.

24. The wavelength shift switch and sensing system as recited in claim 23 wherein said means for transmitting further comprises an optic fiber.

25. The wavelength shift switch and sensing system as recited in claim 24 further comprising at least one optical connector attached to said optic fiber.

26. The process of operating a wavelength shift switch and sensing system comprising the steps of:
   generating a light beam having a first wavelength;
   transmitting said light beam to fluorescent surface moveable with respect to said light beam; and,
   receiving light from said fluorescent surface, said light having a wavelength shifted away from said first wavelength of said generated light beam dependent upon the fluorescent characteristics of said fluorescent surface exposed to said light beam due to said movement.

27. The process of operating a wavelength shift switch and sensing system as recited in claim 26 and further comprising the steps of:
   actuating a structure to which said fluorescent surface is attached in order to relatively displace said fluorescent surface with respect to said light beam; and,
   detecting said received light to determine the position of said structure based upon the fluorescive characteristic exposed to said light beam as a result of said displacement.

28. The process of operating a wavelength shift switch and sensing system as recited in claim 27 wherein the said detecting said received light step further comprises the steps of:
   sensing the intensity of light at a first wavelength;
   sensing the intensity of light at a second wavelength;
   computing the ratio of said intensity of light at a first wavelength with respect to the intensity of light at a second wavelength to form an indication of the position of said structure.

29. The process of operating a wavelength shift switch and sensing system as recited in claim 27 wherein the said actuating a structure step occurs simultaneously with said detecting said received light step.

30. The process of operating a wavelength shift switch and sensing system as recited in claim 27 wherein the said actuating a structure step may occur with said structure actuated simultaneously about two axes.

* * * * *